US008225354B2

(12) United States Patent
Acton et al.

(10) Patent No.: US 8,225,354 B2
(45) Date of Patent: Jul. 17, 2012

(54) MERGING ELECTRONIC PROGRAM GUIDE INFORMATION

(75) Inventors: Colin Lee Acton, Kirkland, WA (US); Cory Jon Cirrincione, Redmond, WA (US); Michael S. Hayton, Kirkland, WA (US); Shawn Pickett, Wake Forest, NC (US); Renaud Bordelet, Dublin (IE); Paul Irwin, Dublin (IE); Hans Peter Hess, Dublin (IE); Hiroshi Ohno, Tokyo (JP); Frederic Azera, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 12/101,758

(22) Filed: Apr. 11, 2008

(65) Prior Publication Data

US 2009/0260038 A1     Oct. 15, 2009

(51) Int. Cl.
*G06F 3/00*      (2006.01)
*G06F 13/00*     (2006.01)
*H04N 5/445*     (2006.01)

(52) U.S. Cl. ............... 725/49; 725/48; 725/50
(58) Field of Classification Search ............... 725/48–50
See application file for complete search history.

(56) References Cited

U.S. PATENT DOCUMENTS

| 3,619,583 | A  | * | 11/1971 | Arnold ........................... 708/230 |
| 5,784,095 | A  | * | 7/1998  | Robbins et al. ................. 725/49 |
| 5,883,677 | A  |   | 3/1999  | Hofmann |
| 6,072,983 | A  | * | 6/2000  | Klosterman .................... 725/49 |
| 6,340,997 | B1 | * | 1/2002  | Borseth ......................... 348/731 |
| 6,628,301 | B1 | * | 9/2003  | Acton et al. ................... 715/716 |
| 7,024,676 | B1 |   | 4/2006  | Klopfenstein |
| 7,036,137 | B1 | * | 4/2006  | Arsenault et al. ............... 725/38 |
| 7,240,356 | B2 | * | 7/2007  | Iki et al. ......................... 725/48 |
| 7,313,806 | B1 | * | 12/2007 | Williams et al. ................ 725/46 |
| 7,389,523 | B2 | * | 6/2008  | Kikinis .......................... 725/46 |
| 7,533,400 | B1 | * | 5/2009  | Hailey et al. .................... 725/49 |
| 7,793,321 | B2 | * | 9/2010  | Simms et al. ................... 725/39 |
| 2003/0051246 | A1 | * | 3/2003  | Wilder et al. .................... 725/49 |
| 2003/0135856 | A1 | * | 7/2003  | Hancock et al. ................. 725/50 |
| 2004/0078807 | A1 | * | 4/2004  | Fries et al. ..................... 725/14 |
| 2004/0172654 | A1 |   | 9/2004  | Pei et al. |
| 2006/0015903 | A1 |   | 1/2006  | MacBeth et al. |
| 2006/0037046 | A1 |   | 2/2006  | Simms et al. |
| 2006/0150214 | A1 |   | 7/2006  | Ramraz et al. |
| 2006/0259926 | A1 | * | 11/2006 | Scheelke et al. ................ 725/48 |
| 2007/0094684 | A1 |   | 4/2007  | Schein et al. |
| 2007/0157248 | A1 |   | 7/2007  | Ellis |

OTHER PUBLICATIONS

Gulden Uchyigit, A Personalised Multi-Modal Electronic Program Guide, European Conference on Interactive Television, 2003, Brighton, UK.
Peter Rosser, A Brief History of ATSC in Media Center, 16.7ms in the life, Feb. 3, 2006, http://blogs.msdn.com/peterrosser/archive/2006/02/03/AtsclnMce.aspx.

* cited by examiner

*Primary Examiner* — Scott Beliveau
*Assistant Examiner* — Alexander Q Huerta
(74) *Attorney, Agent, or Firm* — Vierra Magen Marcus & DeNiro LLP

(57) ABSTRACT

Techniques are disclosed herein for merging EPG data associated with a variety of program sources. In one aspect, EPG data is accessed for different program sources and rules are selected that define how entries in the EPG data are to be merged. The rules may be selected based on whether the EPG data was collected in-band or out-of-band. In addition, the merging rules can be dependent on the program source, which allows the flexibility of applying different rules to different program sources. The EPG data from the different program sources is merged into a single EPG based on the selected rules.

20 Claims, 11 Drawing Sheets

MERGING ELECTRONIC PROGRAM GUIDE INFORMATION

BACKGROUND

An electronic program guide (EPG) application enables a television viewer to navigate through an onscreen program guide and locate television programs and other program content of interest to the viewer. With an EPG application, the television viewer can look at schedules of current and future programming, set reminders for upcoming programs, and/or enter instructions to record one or more television programs. One way in which the EPG application can display an interface for the user is an a grid ("EPG grid") having multiple rows, each of which is associated with a broadcast channel, and multiple columns each of which can be associated with a time slot. Thus, the EPG application is a core application for television viewing that enables the viewer to determine what programs are available to them at a specific time and on a specific channel. Note that an EPG application can be used to display information other than television schedules, such as radio schedules.

To display the EPG grid on the client device, EPG data is provided to the client device. The EPG data includes station identifiers, channel identifiers, schedule information, program titles, ratings, characters, program descriptions, actor names. The EPG data may be transmitted to the client either "in-band" or "out-of-band." By in-band, it is meant that the EPG data is transmitted as a part of the program content. By out-of-band, it is meant that the EPG data is transmitted outside of the program content. Many existing components in user's home entertainment system do not have too much difficulty displaying an EPG grid based on the EPG data that is received by that device alone. For example, a set top box might receive EPG data from a single source, such as a satellite television provider. The set top box displays, on a television, an EPG grid having a channel lineup for the satellite television provider and a schedule of the times that programs are broadcast.

However, some home entertainment systems take a more open approach and allow for the inclusion of multiple simultaneous sources of television programs, each with their own unique channel lineups and schedules. The entertainment system could include a group of connected components such as a cable set top box, a satellite receiver, a personal computer, etc. The program sources could include, for example, a cable broadcast, a satellite broadcast, or a web server streaming Internet Protocol television (IPTV). Note that each of these program sources will typically have its own EPG data that by itself is suitable to form an EPG grid. Furthermore, the system can have multiple tuners, each of which may obtain program content from a different source and obtain its own set of EPG data.

For systems that allow more than one program source and multiple tuners, it can be a challenge to incorporate the different EPG data and present a viewable and conveniently navigable user interface (e.g., an EPG grid) that provides a desirable and efficient user experience.

SUMMARY

Techniques are disclosed herein that dynamically merge the various lineups and schedules from different program sources into a consistent, usable format to extend the typical EPG functionality across these various broadcast sources. Techniques disclosed herein allow EPG data associated with multiple program sources and multiple tuners to be merged into a single lineup of channels that appear to function as a single tuner to the user.

Techniques are disclosed herein for merging EPG data for a variety of program sources. In one aspect, a method includes accessing EPG data for different program sources and selecting rules that define how entries in the EPG data are to be merged. The rules may be selected based on whether the EPG data was collected in-band or out-of-band. In addition, the merging rules can be dependent on the program source, which allows the flexibility of applying different rules to different program sources. The EPG data for the different program sources is merged into "merged EPG data" based on the selected rules. Note that the merged EPG data can be displayed as an EPG grid or can be used for other purposes such as mining for programs to record.

In another aspect, at least one lineup object is created for each tuner that receives program content. Each lineup object contains EPG data for a particular source of the program content. The lineup objects are merged to create a hierarchical tree of lineup objects until a root lineup object is created. Merging the lineup objects includes merging at least two child lineup objects to form a parent lineup object. Merging child lineup objects includes merging EPG data in the child lineup objects. Then, EPG data is displayed to the user based on the EPG data in the root lineup object.

In still another aspect, EPG data for different program sources is accessed. The EPG data includes a first and a second schedule associated with a first channel. The first schedule and the second schedule are merged to form a merged schedule. The merging of the first and second schedules includes: accessing a parameter that is for determining which entries from the first schedule and which entries from the second schedule should be used to form the merged schedule; determining a point in the future based on the parameter; adding entries to the merged schedule from the first schedule that are prior to the point in the future; and adding entries to the merged schedule from the second schedule that are after the point in the future.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
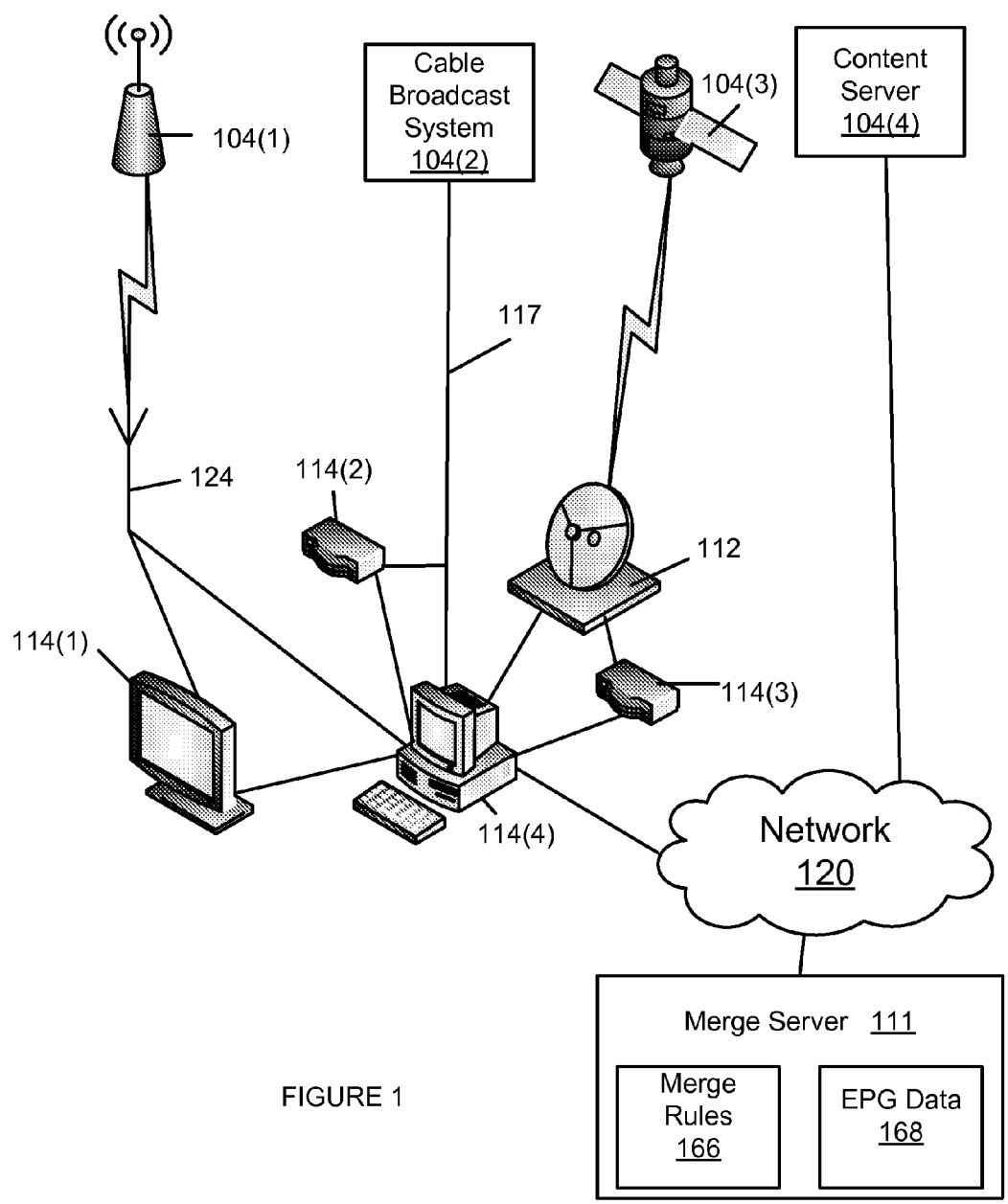
FIG. 1 illustrates an exemplary entertainment system in which various embodiments described herein can be implemented.

FIG. 1 illustrates an exemplary entertainment system 100 in which various embodiments described herein can be implemented. System 100 includes multiple program sources 104 (1)-104(4) and multiple client devices 114(1)-114(4) connected to the program sources 104. A program source 104 refers to the source of a particular signal that is received by a client device 114. Sources 104 can include, without limitation, a local television antenna 104(1), a cable broadcast system 104(2), a satellite 104(3), a content server 104(4) etc.

The local television antenna 104(1) may be used to transmit a signal from a local television (or radio) station. The cable broadcast system 104(2) provides content from a cable television provider. The satellite 104(3) provides a signal for a satellite television provider. The content server 104(4) provides a signal from an Internet television provider. FIG. 1 presents only a few example program sources 104. The signals transmitted by the program sources 104 have embedded therein content such as television programs, movies, commercials, music, and similar audio and/or video content. Thus, the signals from the program sources 104 are not limited to television.

Moreover, program sources 104 also transmit EPG data. The EPG data includes station identifiers, channel identifiers, schedule information, program titles, ratings, characters, program descriptions, actor names. The EPG data may be presented in an EPG grid or other format. An EPG grid refers to a particular type of user interface that is provided by an EPG application and presented to a viewer.

The EPG data may be transmitted to a client 114 either "in-band" or "out-of-band." By in-band, it is meant that the EPG data is transmitted as a part of the program content. By out-of-band, it is meant that the EPG data is transmitted outside of the program content. There are multiple ways of transmitting data in-band. One technique is to transmit the EPG data in the vertical blanking interval in the broadcast television signal. Another technique is to use a portion of the MPEG2 (Motion Picture Experts Group) data stream for EPG data. In one embodiment, the merge server 111 provides out-of-band EPG data 168 that describes the program content for the various program sources 104.

Client devices 114 can be implemented in a number of ways. For example, client device 114(1) is connected to an antenna 124 to receive program content from a local television station. In this example, client device 114(1) is a television set, which can receive content from other clients 114(2)-114(4). Client 114(1) may have a direct connection to clients 114(2) and 114(3) to receive the program content; however, those connections have not been depicted in FIG. 1 so as to not obscure the diagram. In one embodiment, the system 100 includes a television set that does not have a tuner.

Client device 114(2) is connected to a cable network 117 to receive program content from a cable system 104(2). Client device 114(2) is also referred to as a set-top box. Client device 114(3) is coupled to a satellite dish 112 to receive program content from the satellite 104(3). Client device 114(3) may also be referred to as a set-top box or a satellite-receiving device. Client device 114(4) is connected to a network 120 (e.g., the Internet) to receive program content from the content server 104(4). The client device 114(4) can also receive program content from a network source that is not on the Internet. Client device 114(4) may also be referred to as a personal computer. The client devices 114(1)-114(4) have at least one tuner to tune to signals to extract the content.

In one embodiment, the personal computer 114(4) is able to play and record the program content. By the personal computer 114(4) recording content on-the-fly, a user can pause and rewind live television being played on the personal computer 114(4). The personal computer 114(4) can receive the program content in a variety of ways. In one embodiment, the personal computer 114(4) has a tuner card to allow the personal computer 114(4) to directly receive the program content. The tuner card may be installed inside the computer 114(4) by connecting the tuner card to, for example, a peripheral component interface (PCI) expansion slot. Alternatively, the tuner card can be external hardware that is connected to the computer 114(4) by a Universal Serial Bus (USB) cable or the like. A tuner card can be connected to the antenna 124, cable connection 117, and satellite dish 112, as examples.

A tuner card can include, but is not limited to, a single tuner that receives analog broadcast signals, a single tuner for digital signals, a hybrid tuner that can be re-configured to receive either analog or digital signals, and a combination tuner that comprises both an analog tuner and a digital tuner. Note that a hybrid tuner functions as either an analog tuner or a digital tuner at one point in time. However, the hybrid tuner can be reconfigured to operate as the other type of tuner. Because a combination tuner has an analog and a digital tuner, a user can watch an analog broadcast while recording a digital broadcast, or vice versa. Some tuner cards have two (or more) digital tuners and/or two (or more) analog tuners.

An analog tuner may output raw data, which is encoded to an MPEG format by another device such as a processor. For example, a processor in the personal computer 114(4) or other clients 114(1)-114(3) encodes the data to MPEG format. However, some analog tuners are able to encode the received analog signal to MPEG. Because digital television is typically broadcast as an MPEG stream, a digital tuner does not need to encode the broadcast signals. However, the digital tuner may perform such tasks as extracting the correct program identifiers (PIDs) from the MPEG stream.

However, the computer 114(4) (or other client 114) does not require special hardware such as a tuner card to receive the program content from the content server 104(4). Herein, a tuner includes, but is not limited to, any combination of software and hardware that allows a client 114 to receive different network 120 based stations (e.g., television or radio stations). Such a tuner may also be referred to herein as a "virtual tuner." An example of a network 120 based station is a broadcast network such as the American Broadcasting Corporation (ABC) streaming "Internet Television" from a web site. Herein, the streaming of content from a web site will be considered to be a channel. Numerous vendors provide software programs for receiving Internet Television. An example of such a software product is the Microsoft® Mediaroom™ Internet Protocol Television (IPTV) software platform, which is commercially available from Microsoft Corporation of Redmond, Wash.

Note that the personal computer 114(4) can also be connected to other client devices 114(1)-114(3) to allow the personal computer 114(4) to receive program content from the tuners in the other devices 114(1)-114(3). For example, the personal computer 114(4) can be connected to either of the set top boxes 114(2), 114(3) to receive an output single therefrom. The personal computer 114(4) executes software to process the signals output from clients 114(2) or 114(3) to play television programs, etc. on the personal computer 114

(4). An example of such software is the Media Center™ entertainment center, which is commercially available from Microsoft Corporation of Redmond, Wash. Such software can also be used to play television content based on the output of the computer's tuner card. Thus, the personal computer 114(4) can receive and play program content from any of the sources 104(1)-104(4) through a tuner whether the tuner is hardware, software, or some combination of hardware and software.

One or more client 114 devices in the system 100 have logic embedded therein for merging EPG data that the various clients 114 receive from the various program sources 104 or merge server 111. In one embodiment, the logic for merging the EPG data is implemented with software. However, the logic for merging the EPG data could be implemented with a combination of hardware and software. In one embodiment, the personal computer 114(4) performs the merging of the EPG data. However, the merging could be performed by another device or the merging task can be shared by multiple devices.

In one embodiment, to merge the EPG data, the client device 114(4) executes computer readable instructions that are stored on computer readable media. In one embodiment, a portion of these instructions is based on merge rules 166 that are downloaded from the merge server 111. The client device 114(4) has a processor on which the instructions are executed. Computer readable media can be any available media that can be accessed by the client device 114(4). By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the client device 114(4).

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

It is to be appreciated and understood that the exemplary system 100 constitutes but one exemplary operating environment. Accordingly, this description is not intended to limit application of the claimed subject matter to just this one type of operating environment. Rather, the principles described herein can be implemented in other similar or different environments without departing from the spirit and scope of the claimed subject matter.

Figure 2:
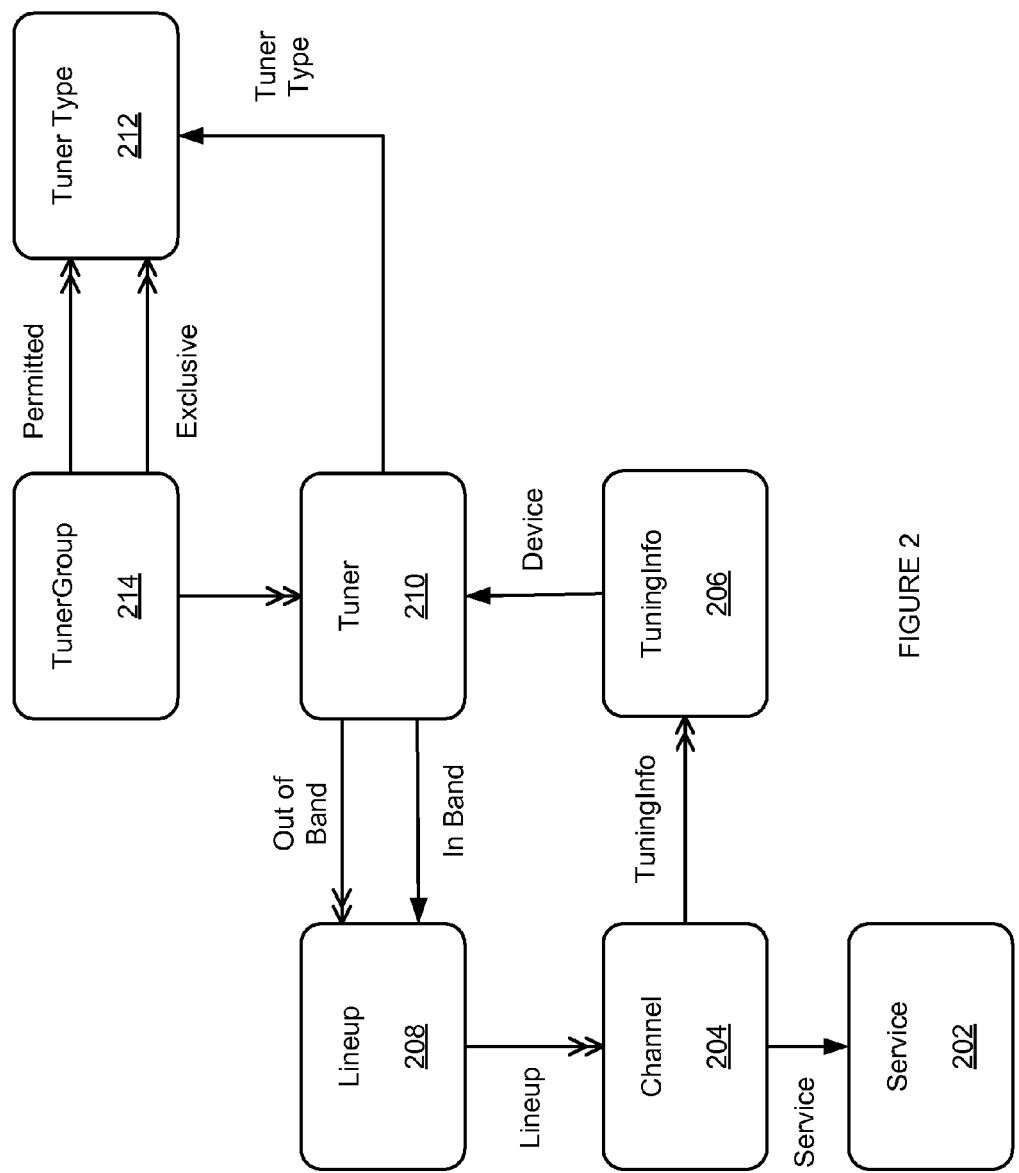
FIG. 2 depicts one embodiment of relationships between various classes of stored objects that represent various elements.

In one embodiment, in order to merge EPG data, a database of software objects is maintained. In one embodiment, the personal computer 114(4) stores the objects. However, any other device at the user's location could store the objects (e.g., set top box, digital video recorder, etc.) FIG. 2 depicts one embodiment of relationships between various classes of stored objects that represent various elements such as services, channels, tuners, etc.

A service refers to a provider of content provided over a transmission media on a specific channel. As examples, the service could be a provider of a television broadcast, broadband streaming service, a radio broadcast, etc. Individual services typically correspond to one row of an EPG grid. Examples of individual services include ABC, CBS, HBO, CNN and BBC, to name just a few. Services typically provide content in the form of programs, such as an episode of a television series, sporting event, movie, radio program, etc. An EPG grid has schedule entries that describe when the programs will be broadcast. An instance of the service class 202 contains information pertaining to the service. For example, a service 202 can have properties associated with it such as whether the service is pay-per-view and whether it allows "on demand" programming.

A channel is a named way (e.g., numbered) that the user can access a service. In FIG. 2, an instance of a channel class 204 references a single instance of a service 202. This referencing is depicted in FIG. 2 by a line with a single arrowhead connecting the channel 204 to the service 202. However, a service 202 may be referenced by any number of channel objects 204. This reflects the fact that a service can be accessed in different ways. For example, a user might access a local television station's broadcast by an antenna 124, by cable 117, or by satellite dish 112. Thus, there could be a different channel object 204 for each of these different ways to obtain the service. However, each channel object 204 may be associated with the same service object 202. Thus, a service object 202 can be referenced by any number of channel objects 204. In one embodiment, channels are merged by "merging" two or more channel objects 204. Merging channel objects 204 may be performed by creating a new channel object 204 based on the channel objects 204 being merged.

Tuning information refers to the information that is sent to a tuner in the system 100 to tune it to capture a particular service that is being broadcast on a particular channel. As previously mentioned, a web site that streams program content can be considered to be a channel, in which case the tuning information can include a URL. An instance of the tuningInfo class 206 stores the tuning information. A channel object 204 has a collection of one or more tuningInfo objects 206, as indicated by the double arrowhead in FIG. 2. As previously stated, channel objects 204 can be merged. When merging of two channels occurs, the tuning information from one or both of the channels may be retained. Therefore, a channel object 204 can specify different ways to tune to the channel as specified by the different tuningInfo objects 206.

An EPG grid typically has a column for the collection of channels, which is referred to as a channel lineup or simply a lineup. To account for this, a lineup object 208 includes a collection of channel objects 204. Because each channel object 204 references one or more tuningInfo objects 206, the tuning information that allows a client 114 tune to the channels is obtainable from a lineup object 208.

Figure 5A:
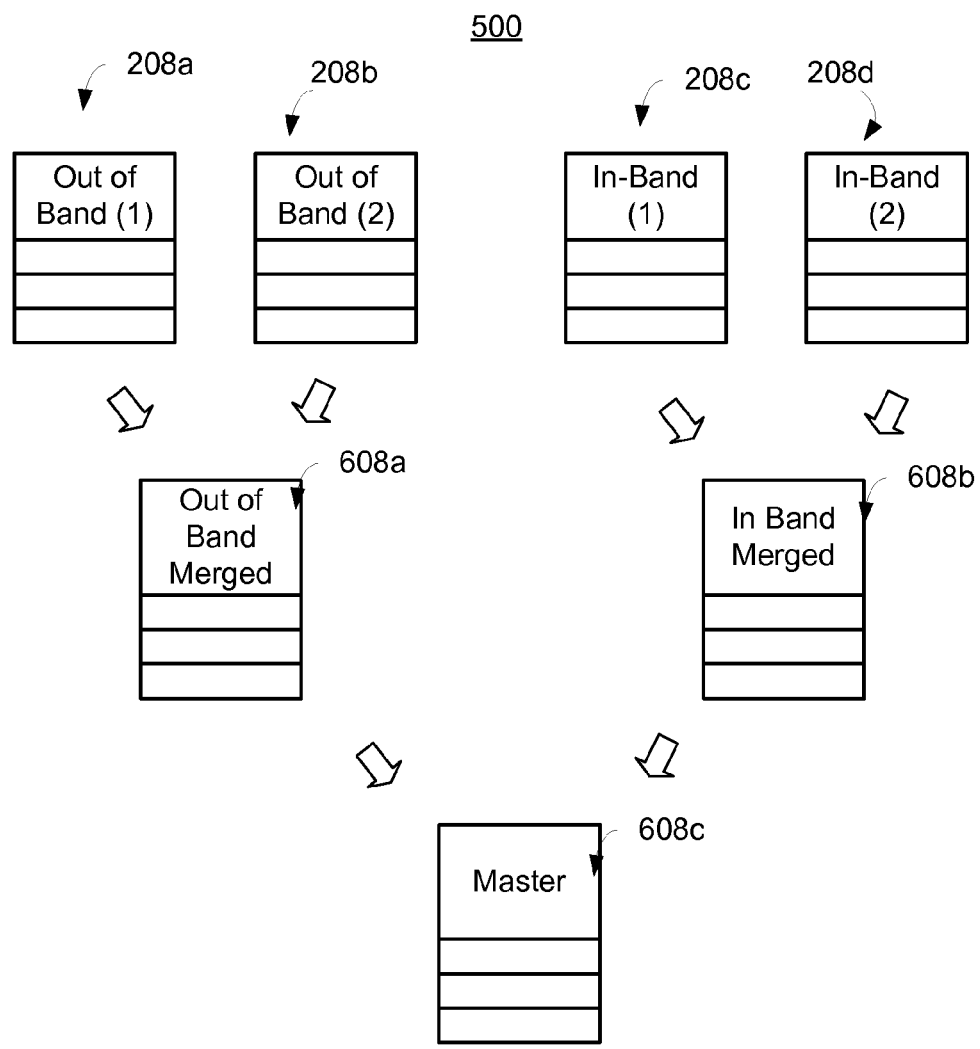
FIGS. 5A and 5B are diagrams of exemplary hierarchical lineup trees composed from lineup objects.
Figure 5B:
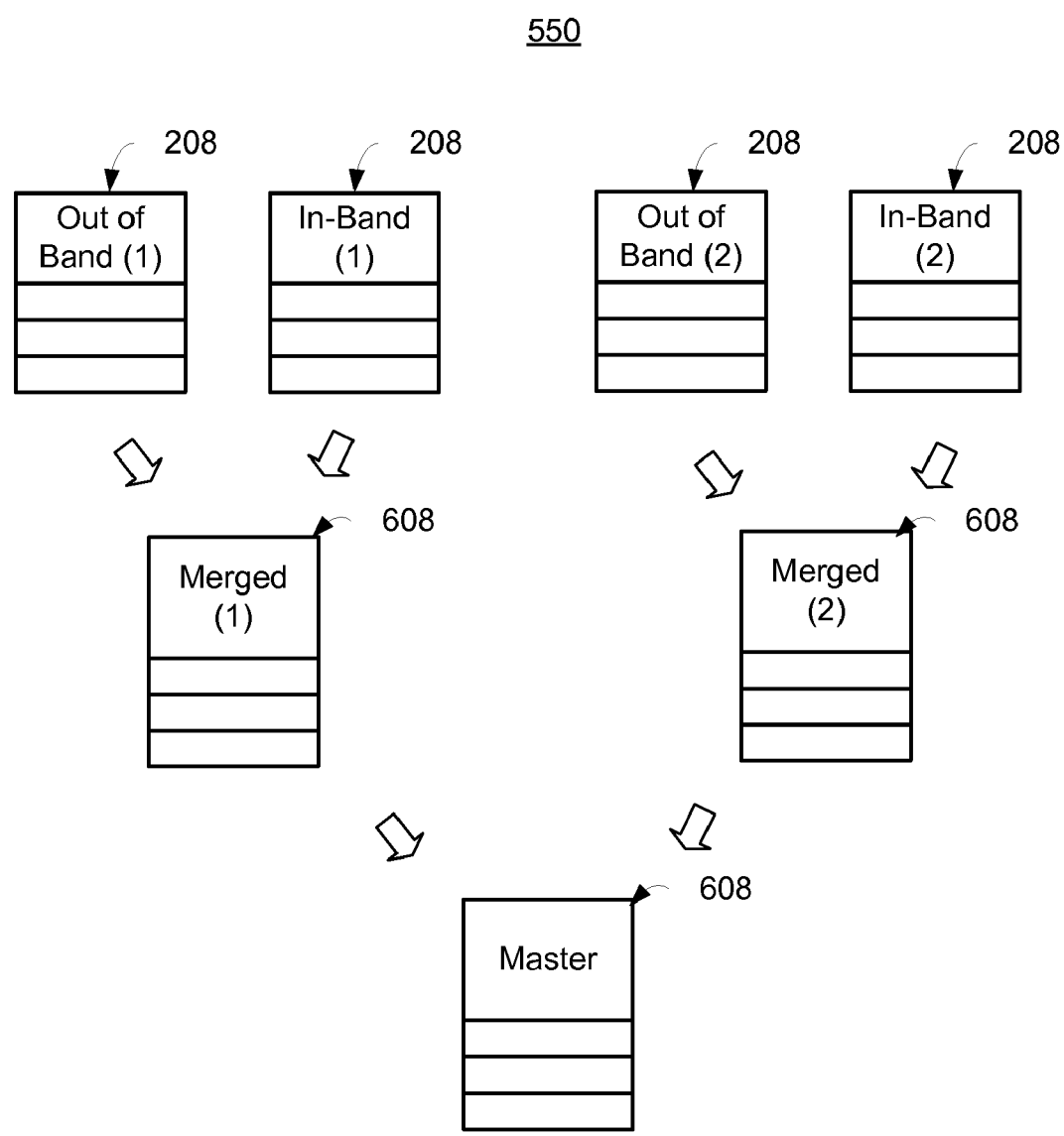

In one embodiment, lineups are categorized as either "in-band" or "out-of-band" depending on how the EPG data for the lineup was acquired. In one embodiment, lineups are merged by "merging" two or more lineup objects 208. FIG. 5A depicts one embodiment for merging lineup objects 208. FIG. 5B depicts another embodiment for merging lineup objects 208. Those embodiments create a "master lineup object 608," which is typically the lineup object used to present the EPG grid. However, the EPG grid could be displayed based on a different lineup object.

A tuner object 210 is representation of a tuner in the system 100 that can independently capture program content. Lineups can be obtained by having the tuner scan for "in-band" EPG data or by obtaining the EPG data "out-of-band." The tuner object 210 contains information based on that collected information. In one embodiment, a tuner object 210 references one in-band lineup object 208 and any number of out-of-band lineup objects 210.

The lineups for a given tuner object 210 may be created during a "first run" procedure and from time to time thereafter. The first run procedure occurs when a user sets up the tuner to start receiving content from one or broadcast sources. In one embodiment, a tuner object 210 has a helper software method that periodically downloads from the Internet (e.g., from merge server 111) EPG data 168 that contains lineups. The helper method typically requests lineups for a particular region such as a country, state, province, postal code, city, etc. Note that the Internet provided lineups are not limited to lineups pertaining to Internet broadcasters. Rather, the Internet provided lineups may include lineups for satellite broadcasters, cable broadcasters, local television stations, etc.

One of the properties of the tuner object 210 is a name. One way to name tuners is based on the content provider from which the tuner receives content. For example, a tuner in a set top box that receives content from satellite television provider "A" can be named to identify provider A. Other techniques can be used to name the tuners. Each tuner object 210 references a tuner type object 212, which includes information about the tuner such as the tuner's name.

Each tuner object 210 is placed into one or more tuner group objects 214. A tuner group object 214 specifies what tuners 210 can be placed into that tuner group object 214 if those tuners exist in the system. In one embodiment, a tuner group object 214 has a list of zero or more exclusive tuners and a list of zero or more permitted tuners. An exclusive list contains the names of tuner objects 210 that are to only be placed into that tuner group object 214. A permitted list contains the names of tuner objects 210 that may be placed into that tuner group object 214, but can also go into another tuner group object 214. Process 300 of FIG. 3 provides additional details of forming tuner groups 214.

Note that merging may be performed on a tuner group basis. Thus, a reason for having an exclusive list and a permitted list in a tuner group object 214 is to allow formation of tuner group objects 214 that allow broadcasters to have some control over what different program sources are included in merged EPG data. As an example, a satellite television provider might desire that any merged EPG data that describes the satellite broadcaster's content does not also include content from other programs sources. For example, a tuner that captures content from the antenna source 104(1) might be permitted in the tuner group, whereas a tuner that captures content from a cable source 104(2) might not be permitted. This allows the satellite provider 104(3) to prevent merging of EPG data of satellite 104(3) and cable 104(2). Typically, there will be more than one tuner group object. However, having more than one tuner group object is not a requirement.

Figure 3:
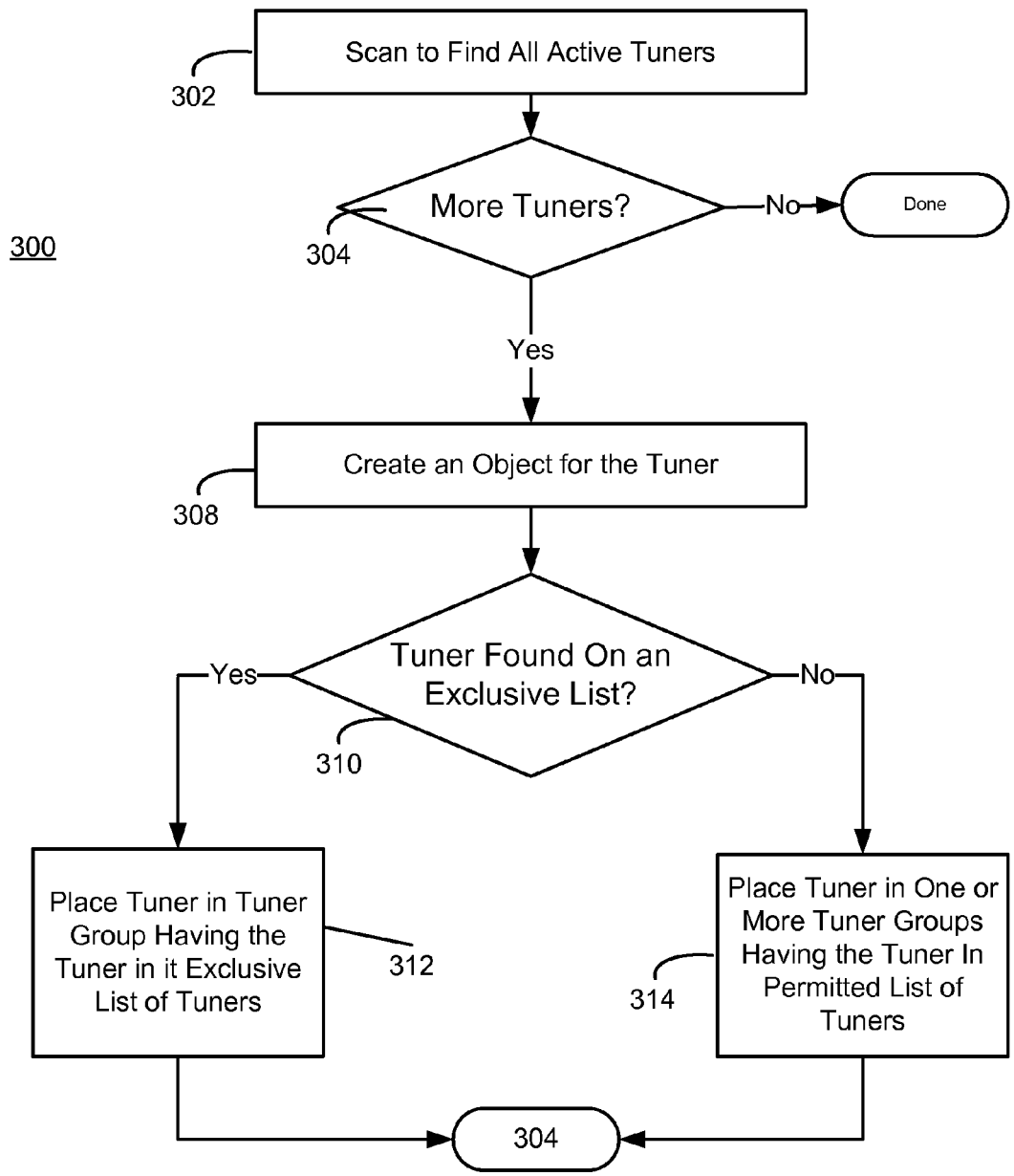
FIG. 3 depicts one embodiment of a process for placing tuners that are found in the system into one or more tuner groups.

FIG. 3 depicts one embodiment of a process 300 for placing tuners that are found in the system 100 into one or more tuner groups. The process 300 may be performed by software in the personal computer 114(4). However, any other client 114 could also perform process 300. In one embodiment, process 300 is performed by associating tuner objects 210 with tuner groups 214. However, process 300 does not require the use of the classes depicted in FIG. 2. Furthermore, process 300 is not limited to object oriented programming techniques.

In step 302, tuners in the system 100 are discovered. The discovery may occur as a result of a user initiating a "first run" procedure in which the user first establishes a channel lineup for the tuners. The following example will be used to illustrate. In this example, a user has purchased a personal computer 114(4) that has one or more tuners, as well as software that allows the personal computer 114(4) to be used to view television based on output of the tuners. The one or more tuners being referred to here include tuner cards and also software and/or hardware that allow access to program content from a network source (e.g., the Internet). Note that a single tuner card can have more than one tuner, in which case a single tuner card may be represented by multiple tuner objects 210. For example, if the television 114 has a tuner card that functions as a single tuner, then the TV tuner card is represented (in a database, for example) by a single tuner object 210. If the set top box has a dual tuner card, then dual tuner card is represented as two tuner objects 210. Software on the user's computer searches for active tuners in response to the user initiating the first run procedure.

Providing that at least one tuner is found in the system 100 (step 304), control of process 300 passes to step 308. In step 308, an instance of the tuner class 210 is created. When creating the tuner object 210, a name for the tuner is determined. As previously discussed, the name may be based on a program provider 104, but this is not required.

In process 300, tuners are placed into tuner groups. Note that tuner group objects 214 that define rules for what tuners can go into the tuner group 214 may be created prior to this step. In step 310, the tuner group objects 214 are searched to determine whether any of the tuner group objects 214 have the name of the tuner on their exclusive list. If the tuner is found on an exclusive list, then control passes to step 312 where the tuner is placed into the tuner group 214, which has the tuner name on its exclusive list. In one embodiment, a tuner of exclusive type is placed into a single tuner group 214.

If the tuner's name is not found on any of the exclusive lists in step 310, then control passes to step 314 to place the tuner into one or more tuner groups 214 that have the tuner's name on their permitted list. In one embodiment, the tuner is placed into every tuner group 214 that has the tuner's name on their list of permitted tuners. In one embodiment, one of the tuner groups 214 only has a list of permitted tuners. This tuner group 214 serves as a catchall in the event that a tuner is not permitted in any other tuner group 214. Process 300 describes just one example technique for placing tuners into tuner groups. Many other techniques could be used.

Figure 4:
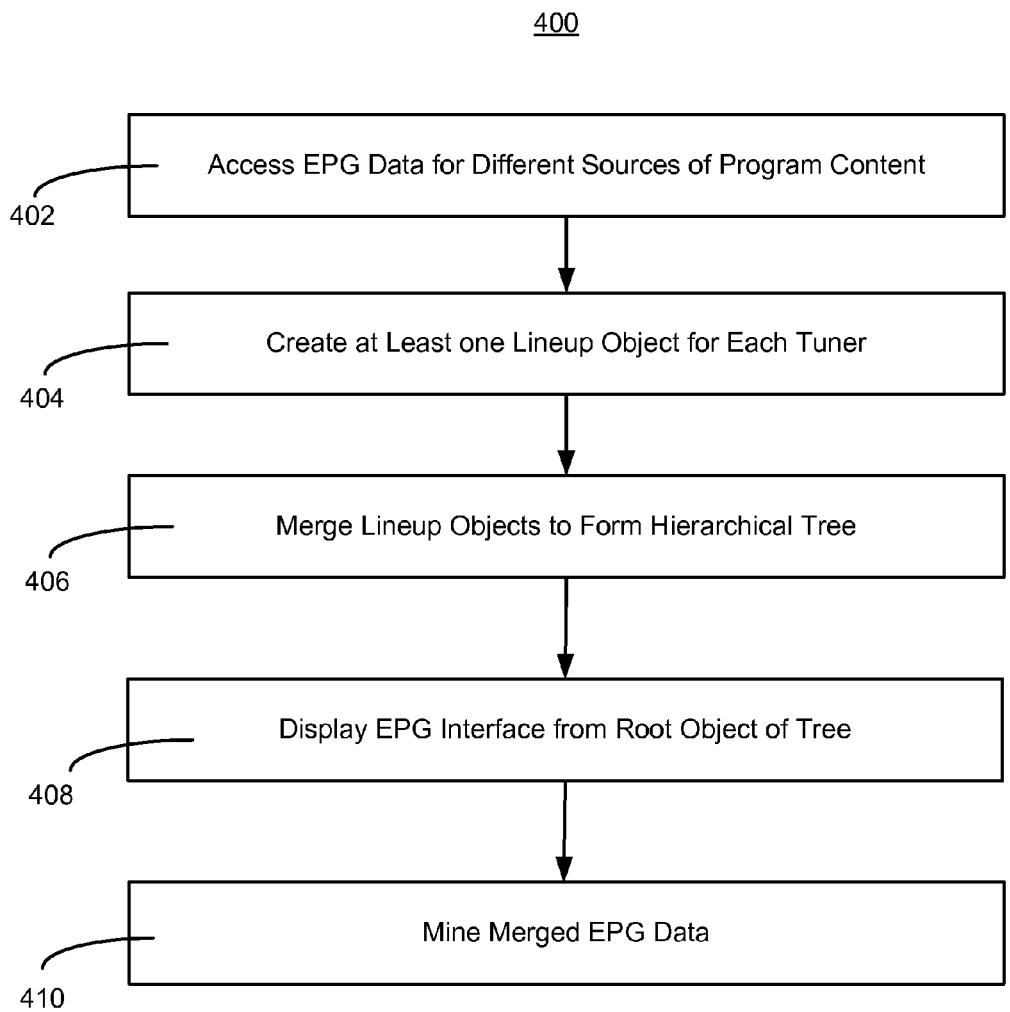
FIG. 4 depicts one embodiment of a process for merging EPG data.

FIG. 4 depicts one embodiment of a process 400 for merging EPG data. In one embodiment, lineups are merged by forming a hierarchical tree of lineup objects 208. FIGS. 5A and 5B are diagrams of exemplary hierarchical lineup trees 500, 550 composed from lineup objects 208. Referring to FIGS. 5A and 5B, the lower levels of a tree 500, 550 contain at least one lineup object that is created from merging two lineup objects from the previous level. Process 400 will be discussed in connection with FIGS. 5A and 5B. However, process 400 does not require the use of the trees of objects depicted in FIGS. 5A and 5A. Furthermore, process 400 is not limited to object oriented programming techniques.

In step 402 of process 400, EPG data for different sources of program content is accessed. Step 402 may occur during a first run procedure or at any time thereafter. The EPG data may be accessed "in-band" or "out-of-band." The different sources of program content may be, for example, a local television broadcaster, a cable television broadcaster, a satellite television broadcaster, or an Internet television source. Note that the EPG data is not necessarily received from the source of the program content. For example, the merge server 111 may provide out-of-band EPG data 168 for various program providers. Program content refers to content that is scheduled to be broadcast or streamed during a particular time period. Examples of program content include, but are not limited to, television programs and radio programs.

In step 404, at least one lineup object 208 is created for each tuner in the system 100. Referring to tree 500 in FIG. 5A, each lineup object 208*a-d* at the leaf level includes information that is based on EPG data for one program source. However, note that multiple lineup objects 208 can be created for a single program source 104. One technique for obtaining the EPG data is through "in-band" scanning. For example, a broadcaster typically embeds EPG data into a portion of the broadcast signal. Objects 208*c* and 208*d* are created based on "in-band" EPG data. Another technique for obtaining the EPG data is through "out-of-band" information. Objects 208*a* and 208*b* are created based on "out-of-band" EPG data. Thus, there can be an "in-band" lineup object and an "out-of-band" lineup object for the same program source 104. As another example, different tuners might be used to tune to the same program source 104, in which case each tuner may have its own set of one or more lineup objects 208.

Step 406 of process 400 is merging lineup objects 208 to form a hierarchical tree. Referring to FIG. 5A, the second level of the tree 500 contains an out-of-band merged lineup object 608*a* and an in-band merged lineup object 608*b*. Merged lineup objects 608*a* and 608*b* are created by merging the leaf objects 208*a-d* as depicted in the diagram. In one embodiment, when merging two lineup objects 208 one is designated as primary lineup and the other is designated a secondary lineup. Merging rules that define how to merge the lineup objects 208 have conditions that are based on the designation. For example, if duplicate (or matching) channels are found in the two lineups, keep the channel from the primary lineup and discard the channel from the secondary lineup. Further examples of merging rules are discussed below.

Merging of lineup objects 208 continues until a master (or root) object is created. In this example, the master lineup object 608*c* is created by merging the out-of-band merged lineup object 608*a* and the in-band merged lineup object 608*b*. Note that herein, a lineup object may be referred to with reference numeral 208 or 608 depending on whether it is being discussed as an object to be merged or one that is created by merging other lineup objects. Also note that herein, the objects to be merged may be referred to as "child" objects and the resultant merged object as a "parent" object.

In step 408 of process 400, a merged EPG interface (e.g., EPG grid) is displayed based on the root or master lineup object 608. The EPG interface can be displayed in connection with a variety of functions. For example, the personal computer 114(4) may have a software program that allows the user to watch and record television. The merged EPG interface can be displayed in response to a user request to display a program guide of television listings. The user can select a program from the program guide, wherein the tuning information in a tuningInfo object 206 is used to automatically tune the appropriate tuner in the system 100 such that the user may watch the program. The merged EPG interface may also be displayed in an interface that allows the user to establish programs to record. When the program to be recorded is broadcast, the tuner in the system 100 is automatically tuned to the proper channel such that the personal computer 114(4) can record the program.

In optional step 410, the merged EPG data is mined. For example, the merged EPG data is searched to locate programs to automatically record. Mining the merged EPG data can be used for many other purposes.

Note that the trees 500, 550 only show a few lineup objects 208, 608. However, there might be many more lineup objects 208 at the leaf level, resulting in many more merged lineup objects 608. As an example, there might be multiple different types of in-band lineup objects corresponding to different types of in-band EPG data. That is, the in-band EPG data could be broken down into data that is frequently sent and describes what is on now, data that is frequently sent and describes what is on next, and data that is less frequently sent and describes what is on over the next 14 days. The less frequently sent data typically is more detailed than the frequently sent data; however, the frequently sent data can be more accurate due to factors such as programs overrunning their time slots.

Referring to FIG. 5A, all of the out-of-band lineup objects 208 can be merged together and all of the in-band lineup objects 208 can be merged together. Note that the hierarchy does not need to be structured as always merging two lineup objects. When merging three lineup objects, two can be selected for an initial merge. Also, note that is it not required that the merging start by merging two out-of-band lineup objects 208 as depicted in FIG. 5A. FIG. 5B depicts an example in which the first step is to merge an out-of-band lineup object 208 with an in-band lineup object 208. As an example, the first step can be to merge the in-band EPG data from a satellite television provider with out-of-band EPG data for that same satellite television provider.

Note that the hierarchical trees 500, 550 can easily be modified in response to changes to EPG data. For example, after the master object 608*c* in FIG. 5A has been created, it is possible that a change might occur to a lineup object 208 at the leaf level. Such changes are propagated down the tree 500 to the master lineup object 608*c*. Consider the example in which the name of a given channel changes. This change will cause the modification of, for example, leaf lineup object 208*a*. Then, that change is propagated down to merged lineup object 608*a*, and finally to the master object 608*c*.

Figure 6:
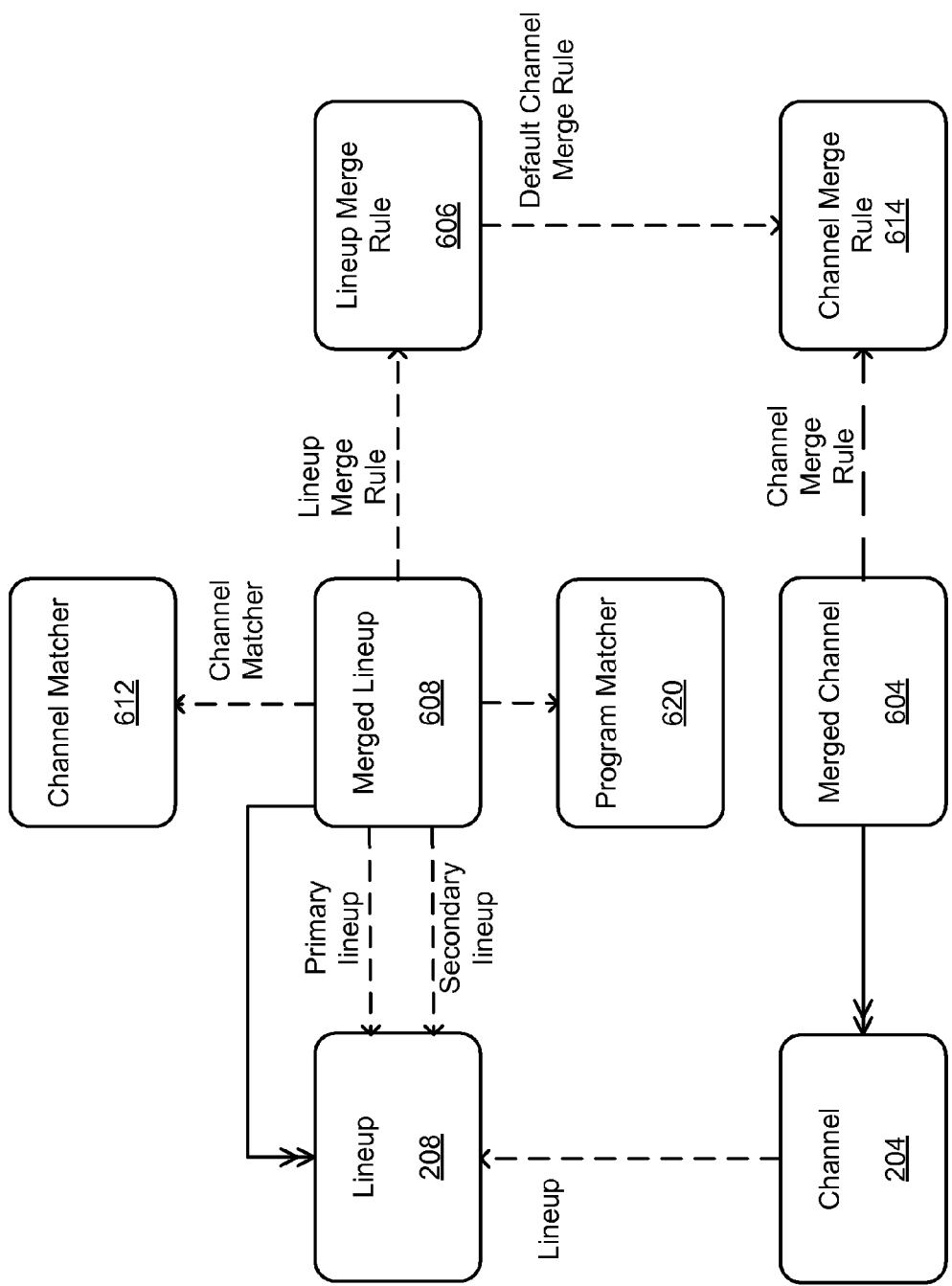
FIG. 6 shows one embodiment of relationships between classes used in the merging of lineups and channels.

FIG. 6 shows one embodiment of relationships between classes used in the merging of lineups and channels. In one embodiment, software objects corresponding to the classes are stored in a database on the personal computer 114(4). However, another device could store these software objects. Some of the objects contain instructions that are executed on a processor to merge lineup objects 208 and to merge channel objects 204.

As previously discussed, lineup objects 208 are merged to form merged lineup objects 608. Referring back to FIG. 5A, master lineup object 608*c* is formed from merging the other lineup objects in the tree 500. In one embodiment, the merged lineup class 608 derives from the lineup class 208, but adds member variables to keep track of the constituent lineups and merging rules. Furthermore, the merged lineup 608 class adds methods to implement the merging operation and to maintain the merger as the constituent lineups are changed.

In general, merging two lineup objects 208 into a merged lineup object 608 includes determining which channels 204 from the lineup objects 208 designated as the primary and the secondary should be merged together, which channels 204 should just be copied, and which channels 204 should be dropped.

Occasionally, a lineup object 208 is modified due to changes to the EPG data that is received. For example, a channel might be added or dropped. Whenever a lineup object 208 is modified, a determination is made as to which merged lineup objects 608 refer to the modified lineup object 208. For example, if object 208*a* in FIG. 5A is modified, a determination is made that object 608*a* "refers" to object 208*a*. In one embodiment, a merged lineup object 608 includes a software method that is used to update the merged lineup object 608 based on changes made to lineup objects 208 that were merged to create the merged lineup object 608. For example, object 608*a* in FIG. 5A includes a software method that is used to determine if changes to object 208*a* will affect it. If so, then the changes to object 608*a* are propagated to master object 608*c*.

The following describes an example mechanism by which channels may be merged. Each instance of the merged lineup class 608 references a channel matcher object 612 that is used to determine whether channels in different lineup objects 208 are the same channel. For example, object 608*a* references a channel matcher object 612 that is used to determine whether two channels in objects 208*a* and 208*b* are in fact the same channel. For example, both channels are for BBC, but one was obtained from in-band scanning and the other from out-of-band scanning. Note that a channel name that was obtained by in-band scanning may have a different format that the name obtained through out-of-band means. In one embodiment, the name of channels are normalized prior to comparing channel names. The channel matcher class 612 has a method that performs such processing on the channel name such as standardizing case and removing whitespace. Then, the channel names are compared to determine whether the two channels are in fact the same. As a particular example, BBC1, BBC 1, and BBC ONE may be normalized to BBC 1.

The merged channel class 604 derives from the channel class 204. An instance of the merged channel class 604 references a channel merge rule object 614, which contains rules for merging channel objects 204. In one embodiment, at least some of the rules are implemented by setting a flag in the channel merge rule object 614, wherein the value of the flag indicates how merging should be performed. Any number of different channel merge rule objects 614 can be stored such that different channel merge rules can be selected. The selection of which channel merge rules to use may be based on factors including, but not limited to, whether the EPG data for the channel was collected in-band or out-of-band, what tuner is used to tune to the channel, and what content provider is associated with the EPG data.

The following are exemplary channel merge rules for purpose of illustration. A primary channel is a channel in a primary lineup and a secondary channel is a channel in a secondary lineup. A rule "overrideService" indicates whether the service from the secondary channel should be given priority over the service from the primary channel. That is, the value of a flag in a field "overrideService" in the channel merge rule object 614 indicates the priority. A rule "usePrimaryTuningInfo" indicates whether tuning information from the primary channel should be included in the merged channel. A rule "useSecondaryTuningInfo" indicates whether tuning information from the secondary channel should be included in the merged channel. Thus, note that a merged channel can be accessed from two different tuners in some cases.

Figure 8:
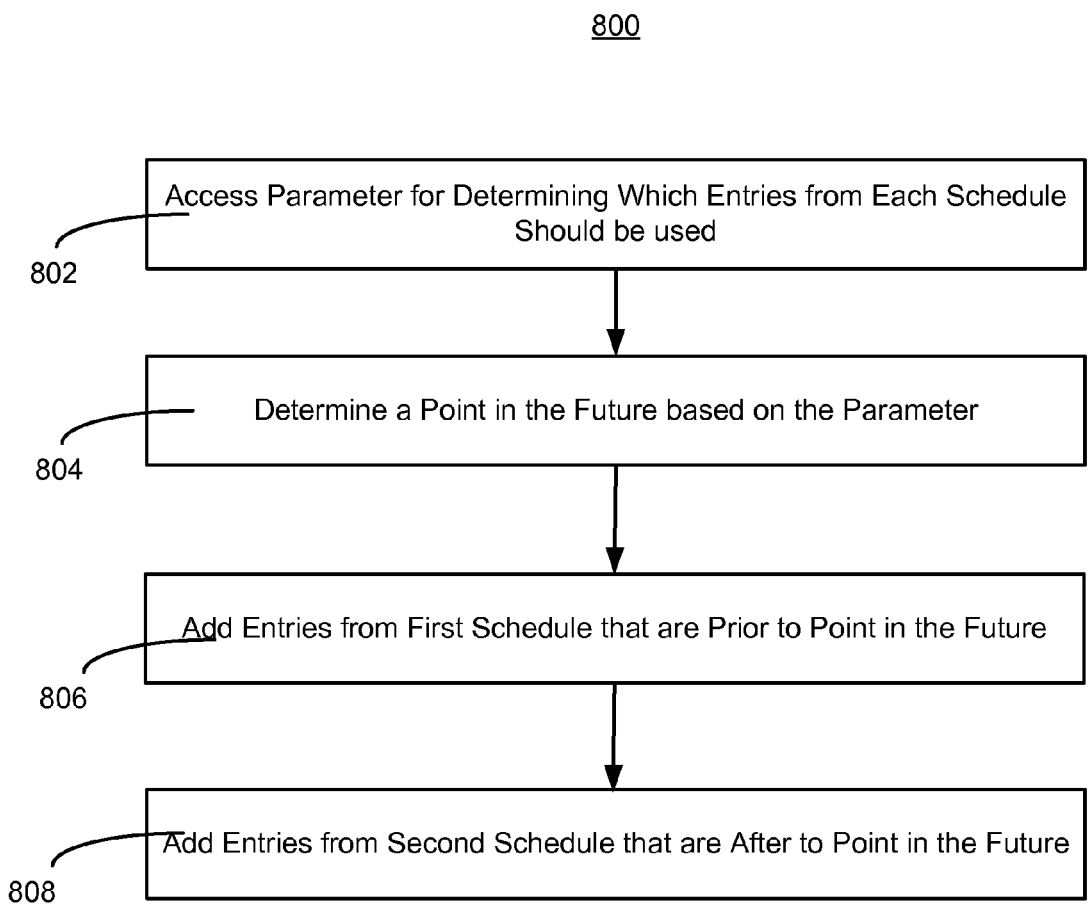
FIG. 8 depicts one embodiment of a process of merging schedules.

Continuing with the discussion of example channel merge rules, "mergeSchedules" indicates whether the schedule entries from the primary and secondary channels should be merged. As an example, the primary might contain schedule entries for the next week, whereas secondary has schedule entries covering the next two weeks. In one embodiment, entries from the primary are used for the next week while ignoring entries from the secondary from the next week. However, the entries for the secondary from the second week are used. The rule "amountOfTimeToUsePrimarySchedule" indicates the time period to prefer schedule entries from the primary service before using schedule entries from the secondary. If schedule entries are not merged, the entries from one or the other are used based on the overrideService flag. FIG. 8 describes additional details of merging schedules.

A rule "mergePrograms" indicates whether the program information from the primary and secondary channels should be merged. Program information refers to titles, actors, plot description, etc. For example, a plot description from the secondary channel that is not contained in the primary channel may be merged such that the user is presented with the detailed information. If the program information is not merged, the program information may be taken from either the primary or the secondary.

The following describes an example mechanism by which lineups may be merged. An instance of the merged lineup class 608 references a lineup merge rule object 606, which contains rules for merging lineup objects 208. Any number of lineup merge rule objects 606 can be stored, such that different rules can be established for different merging situations. For example, different lineup merge rules can be used for different tuner groups 214. As another example, different lineup merge rules can be used depending on which nodes in the trees 500, 550 are being merged.

The following are exemplary lineup merge rules. In one embodiment, the set of lineup merge rules that are used depends on whether lineup objects 208 being merged contain EPG data that was collected "in-band" or "out-of-band." For example, referring to FIG. 5A objects 208*a* and 208*b* are merged in accordance with a first set of rules, whereas objects 208*c* and 208*d* are merged in accordance with a second set of rules. Objects 608*a* and 608*b* might be merged with a third set of rules that merge an "in-band" object with an "out-of-band" object. The leaf objects in tree 550 or FIG. 5B might also be merged with the third set of rules.

In one embodiment, one of the lineup objects 208 is designated a primary object and the other lineup object 208 is designated a secondary object. One example lineup merge rule is "keepAllPrimary," which is a Boolean that indicates whether channels from the primary lineup that cannot be matched to other channels should be added to the merged lineup object 608. Another example lineup merge rule is "keepAllSecondary," which is a Boolean that indicates whether to add channels from the secondary lineup which cannot be matched to other channels to the merged lineup object 608.

For example, consider the example in which lineup object 208*a* is designated as the primary lineup and object 208*b* is designated as the secondary. Object 208*a* is based on EPG data collected out-of-band from a satellite television provider. For example, the merge server 110 sent this EPG data 166 over the Internet. Object 208*b* is based on EPG data that was collected "in-band" by the tuner connected to the satellite dish 112. In this example, keepAllPrimary is true and keepAllSecondary is false. If there is a channel in object 208*a* that cannot be matched to any channel in object 208*b*, then it is kept. However, a channel in object 208*b* that cannot be matched to any channel in object 208*a* is discarded. In one embodiment, there is a rule "defaultChannelMergeRule," which is the default channel merge rule for this merged lineup that can be overridden on specific merged channels.

Figure 7:
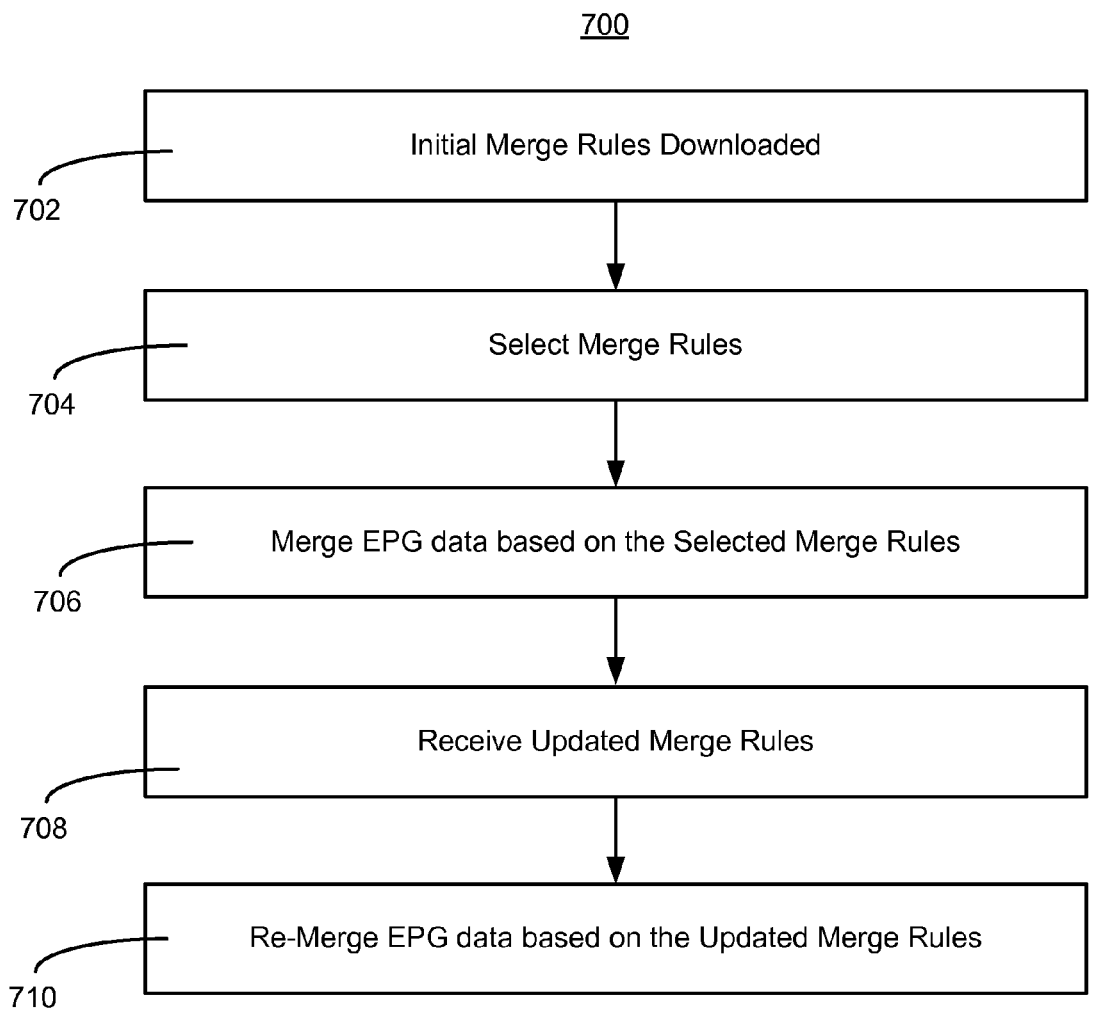
FIG. 7 depicts one embodiment of a process of merging EPG data in view of updated rule sets.

Note that both the lineup merge rules and the channel merge rules can be easily modified to adapt to changing circumstances. To change the rules, a new instance of the lineup merge rule class (or channel merge rule class) is instantiated with the desired rules included in the instance. FIG. 7 depicts one embodiment of a process 700 of merging EPG data in view of updated rule sets. In one embodiment, process 700 is implemented by personal computer 114(4). However, process 700 can be implemented by another device. In one embodiment, process 700 uses objects based on the classes depicted in FIGS. 2 and 6. However, process 700 does not require the use of the classes depicted in FIGS. 2 and 6. Furthermore, process 700 is not limited to object oriented programming techniques. Process 700 begins after EPG data has been collected from different sources.

In step 702, initial merge rules are downloaded. In one embodiment, these initial merge rules 166 are downloaded from the merge server 111 at the first run procedure. One or more lineup merge rule objects 606 and one or more channel merge rule objects 614 may be created based on these initial merge rules. Different rule objects 606, 614 can be created to handle in-band versus out-of-band merging. For example, one lineup merge rule object 606 is created to handle merging two lineup objects 208 that are based on out-of-band EPG data and another lineup merge rule object 606 is created to handle merging two lineup objects 208 that are based on in-band EPG data.

In step 704, rules for merging the EPG data are selected. In one embodiment, a merged lineup object 608 selects one of the lineup merge rule objects 606 and the merged channel object 604 selects one of the channel merge rule objects 614. In step 706, the EPG data is merged based on the selected rule sets.

In step 708, updated rule sets are received. For example, from time to time the personal computer 114(4) contacts the merge server 111 for updated EPG data 168. Typically, the personal computer 114(4) is seeking updated guide information, but if the merge server 111 has updated merge rules 166 those may be sent with the guide information. Alternatively, the merge server 111 notifies the personal computer 114(4) that updated merge rules 166 are available.

In step 710, the EPG data is re-merged based on the updated merge rules. In one embodiment, step 710 includes creating new instances of the lineup merge rule objects 606 and channel merge rule objects 614. Then, process 400 may be executed to merge the EPG data. Also, note that the rules for forming tuner groups 214 may be updated. If the tuner group rules are changed, then process 300 is performed prior to process 400 to place the tuners into new tuner groups.

In one embodiment, the schedule from the primary channel is fleshed out with the schedule from the secondary channel. For example, schedule entries from the secondary channel with start times after the last schedule entry from the primary channel will be used. As another example, schedule entries from either the primary or the secondary might be expected to be more accurate than the other. As a particular example, the primary channel might be based on in-band information, whereas the secondary channel might be based on out-of-band information. Note that in-band information might be more accurate for programs in the near future, but that out-of-band might be more accurate for programs in the more distant future. For example, the in-band data can be updated by the broadcaster to indicate that a sporting event is going to run over its previously scheduled time. However, the broadcaster may not wish to include in-band information for programs more than a week in the future in order to conserve bandwidth. Thus, out-of-band information may be more accurate for programs in the more distant future.

FIG. 8 depicts one embodiment of a process 800 for merging schedule entries. In one embodiment, process 800 uses objects based on the classes depicted in FIGS. 2 and 6. However, process 800 does not require the use of the classes depicted in FIGS. 2 and 6. Furthermore, process 800 is not limited to object oriented programming techniques. In step 802, a parameter for determining which entries from each schedule should be merged is accessed. In one embodiment, the parameter is accessed from a channel merge rule object 614 that is referenced by a merged channel object 604 that represents the primary and the secondary channels. Note that more than a primary and a secondary channel can be merged. For example, the merging can involve many different types of in-band data and one or more types of out-of-band data.

In step 804, a point in the future is determined based on the parameter. In one embodiment, the channel merge rule object 614 has a channel merge rule that specifies an amount of time to use the primary schedule. After the specified time, the merge uses schedule entries from the secondary channel. Note that more complex rules can be used that specify the amount of time to use three or more schedules.

In step 806, entries from the primary schedule that are up until the point in the future are added to the merged schedule. For example, entries for the next week are taken from the primary schedule. In step 808, entries from the secondary schedule that occur after the point in the future are added to the merged schedule.

In one embodiment, to create the merged schedule, a new service 202 is created for the merged channel 604 that is identical to the service 202 of the primary channel 204. Then, the schedule of the primary channel 204 is duplicated with the new schedule entries referencing the new service 202. After the crossover time, the schedule is duplicated from the secondary channel 204.

In one embodiment, the merged lineup class 608 has a program matcher object 620 to determine whether programs match and a program merger object to merge programs. The program matcher 620 may determine whether or not programs match by matching title names and episode titles. In one embodiment, the channels have program objects (not depicted in FIG. 6). The program objects from the primary channel's schedule entries are merged with the program objects from the secondary channel's schedule entries if the two programs match.

In one embodiment, new program matcher classes are derived from the program matcher class to implement specific program matching. Likewise, derived program merger classes (not depicted in FIG. 6) can be introduced.

In one embodiment, the user is informed that the same channel from multiple sources has been merged. For example, a message is displayed that "channel 6" in the EPG grid is the result of merging the satellite television provider's version with the local television station's version. Of course, when presenting the content, a tuner is selected to tune to one provider or the other. In one embodiment, the user is allowed to specify whether each of the sources should be included or excluded from future merges. For example, the user may determine that the satellite provider's transmission for that channel is of poorer quality than the antenna based transmission of the local station. In this case, the user may determine that channel from the satellite provider should not be merged. Thus, the user's system will not tune to the satellite provider when tuning to that channel.

In one embodiment, the user is allowed to specify a preferred order between the channels that are merged to form a single channel. In effect, the order dictates a preferred tuning in that when tuning to the merged channel, first an attempt is made to tune to the first of the merged channels. However, if a signal from the first channel cannot be obtained, then an attempt is made to tune to the second of the merged channels.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

Figure 9:
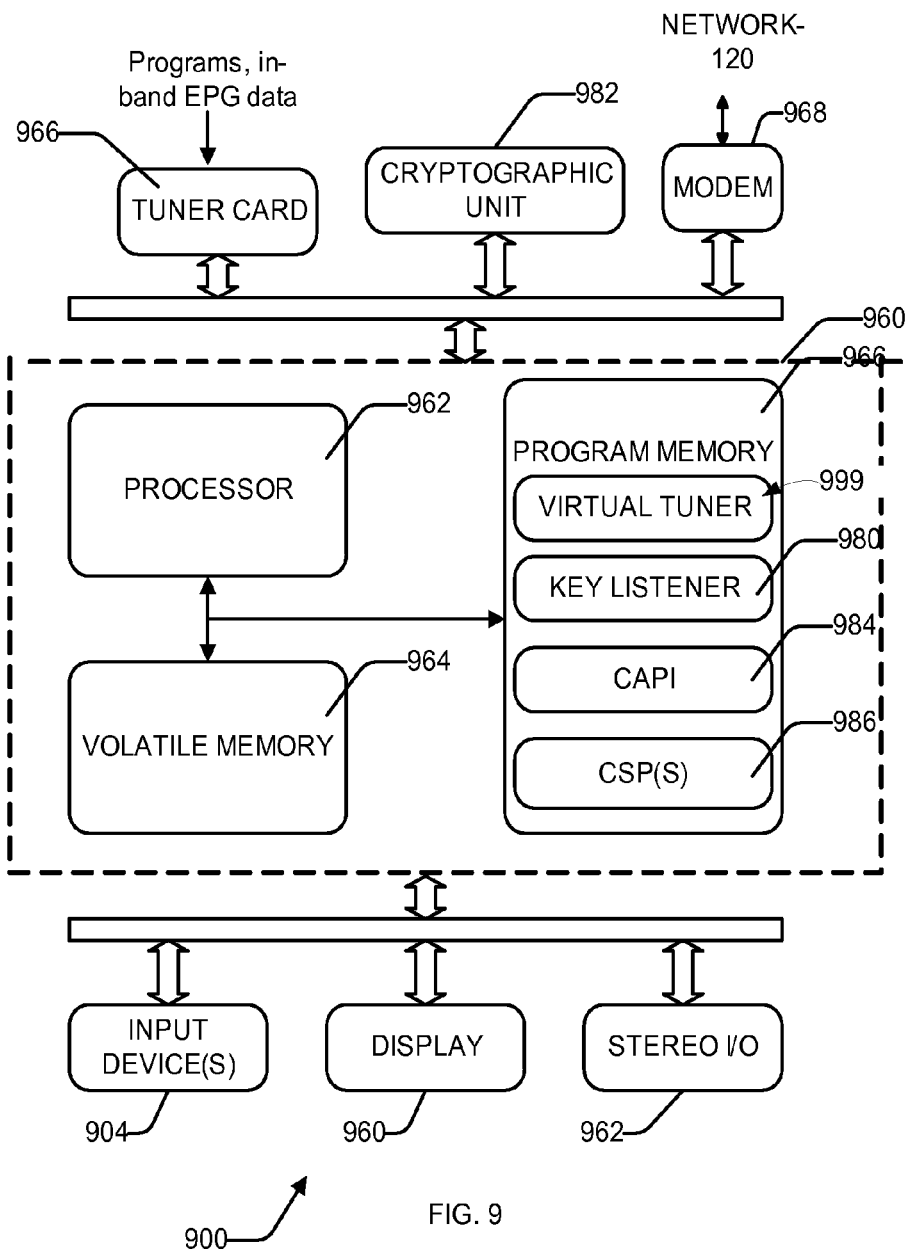
FIG. 9 shows an example configuration of a broadcast-enabled computer that serves as a platform for some embodiments of the present invention.

At least some of the embodiments disclosed herein may be implemented on client 114(4). FIG. 9 shows an example configuration of a broadcast-enabled electronic media device 900 that may serve to implement at least a portion of the client 114(4). Device 900 includes a central processing unit 960 having a processor 962, volatile memory 964 (e.g., RAM), and program memory 966 (e.g., ROM, Flash, disk drive, floppy disk drive, CD-ROM, etc.). The device 900 has one or more input devices 904 (e.g., keyboard, mouse, etc.), a video display 960 (e.g., VGA, SVGA), and a stereo I/O 972 for interfacing with a stereo system.

The device 900 has one or more tuners that tune to appropriate addresses on network 120 or frequencies not on the network 120. As previously discussed, the tuner can be a tuner card 976 coupled to the cable 117, antenna 124, or satellite dish 115. Alternatively, the tuner is a "virtual tuner" 999 implemented in software that allows access to content server 104(4) through modem 968. The tuner card 976 may be configured to receive either analog or digital data. For example, the tuner card 976 can receive MPEG-encoded digital video and audio data, as well as data in many different forms, including software programs and programming information in the form of data files. The device 900 also has a modem 968, which provides dial-up access to the data network 120 to provide a back channel or direct link to the servers 104(4), 111. In other implementations of a back channel, the modem 968 might be replaced by a network card, or an RF receiver, or other type of port/receiver that provides access to the back channel.

The device 900 runs an operating system that supports multiple applications. The operating system may be a multitasking operating system that allows simultaneous execution of multiple applications. The operating system may employ a graphical user interface windowing environment that presents the applications or documents in specially delineated areas of the display screen called "windows."

The device is illustrated with a key listener 980 to receive authorization and session keys transmitted from the servers 104(4), 111, if necessary. The keys received by listener 980 are used by cryptographic security services implemented to enable decryption of the session keys and data. Cryptographic services are implemented through a combination of hardware and software. A secure, tamper-resistant hardware unit 982 is provided external to the CPU 960 and two software layers 984, 986 executing on the processor 962 are used to facilitate access to the resources on the cryptographic hardware 982.

The software layers include a cryptographic application program interface (CAPI) 984 that provides functionality to any application seeking cryptographic services (e.g., encryption, decryption, signing, or verification). One or more cryptographic service providers (CSPs) 986 implement the functionality presented by the CAPI to the application. The CAPI layer 984 selects the appropriate CSP for performing the requested cryptographic function. The CSPs 986 perform various cryptographic functions such as encryption key management, encryption/decryption services, hashing routines, digital signing, and authentication tasks in conjunction with the cryptographic unit 982. A different CSP might be configured to handle specific functions, such as encryption, decryption, signing, etc., although a single CSP can be implemented to handle them all. The CSPs 966 can be implemented as dynamic linked libraries (DLLs) that are loaded on demand by the CAPI, and which can then be called by an application through the CAPI 984.

Figure 10:
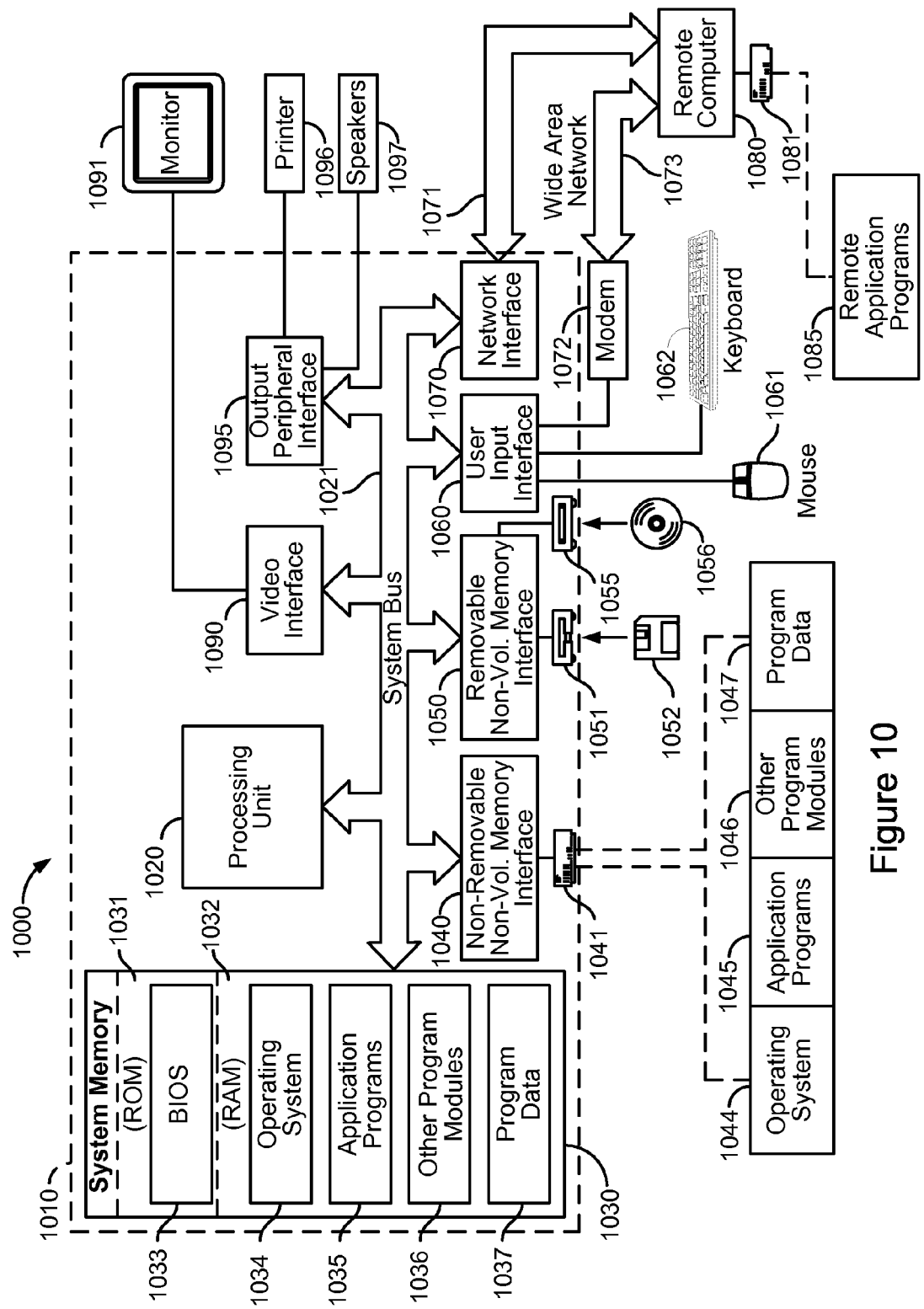
FIG. 10 is a block diagram for an embodiment of a computing environment for implementing the present technology.

FIG. 10 is a block diagram for an embodiment of a computing environment for implementing the present technology. In some embodiments, the computing environment of FIG. 10 may be used to implement server 111 and client 114 of the system of FIG. 1.

Computing environment 1000 of FIG. 10 is only one example of a suitable computing environment and is not intended to suggest any limitation as to the scope of use or functionality of the technology herein. Neither should the computing environment 1000 be interpreted as having any dependency or requirement relating to any one or combination of components illustrated in the exemplary operating environment 1000.

With reference to FIG. 10, an exemplary system for implementing the technology herein includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1040 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 100 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1090.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A machine implemented method for merging electronic program guide (EPG) data, the method comprising:
    scanning to find active tuners, each tuner is able to obtain EPG data from zero or more in-band sources and zero or more out-of-band sources;
    creating a lineup object for each of the sources of EPG data for each of the active tuners;
    accessing EPG data for a plurality of sources of program content, the accessing includes receiving the EPG data from the active tuners;
    selecting rules from a plurality of rule sets, the selected rules define how the EPG data for a pair of the lineup objects is to be merged, the pair of lineup objects include a primary lineup object and a secondary lineup object, the rule sets include a first set for merging in-band EPG data from a primary object and a secondary object, a second set for merging out-of-band EPG data from a primary and a secondary object, and a third set for merging in-band EPG data from a primary object and out-of-band EPG data from a secondary object; and
    merging the EPG data from the plurality of sources into merged EPG data based on the selected rules.

2. A method as recited in claim 1, wherein the selecting rules depends upon the source of the program content.

3. A method as recited in claim 1, further comprising:
    receiving an updated version of the plurality of rule sets;
    accessing new EPG data for the plurality of sources of program content;
    selecting new rules from the updated version of the plurality of rule sets; and
    merging the new EPG data into a new EPG based on the selected new rules.

4. A method as recited in claim 1, further comprising:
    segregating tuners that receive programs from the plurality of sources into a plurality of tuner groups; and
    forming a separate channel lineup for each tuner group, wherein each channel lineup includes all channels that are available for every tuner in a tuner group.

5. A method as recited in claim 1, further comprising:
    displaying an EPG interface based on the merged EPG data.

6. A method as recited in claim 1, further comprising:
    mining the merged EPG data.

7. A method as recited in claim 1, further comprising:
    displaying a user interface that indicates that the merged EPG data contains a channel that has been merged, the channel is available from at least two different sources of the plurality of sources; and
    allowing the user to select which of the at least two different sources will be used in future merges of the channel.

8. A method as recited in claim 1, further comprising:
    displaying a user interface that indicates that the merged EPG data contains a channel that has been merged, the channel is available from at least two different sources of the plurality of sources; and
    allowing the user to select which of the at least two different sources the user prefers to tune to for the channel.

9. A method as recited in claim 1, wherein the merging the EPG data from the plurality of sources into merged EPG data based on the selected rules forms final merged data and includes:
    merging in-band EPG data based on the first set of rules to form merged in-band EPG data;

merging out-of-band EPG data based on the second set of rules to form merged out-of-band EPG data; and merging the merged in-band EPG data with the merged out-of-band EPG data based on the third set of rules to form the final merged EPG data.

10. A computer storage device having stored thereon a set of instructions which, when executed on a processor, cause the processor to perform: scanning to find active tuners;

creating a tuner object for each tuner that is found, each tuner object has a name; placing each of the tuner objects into one of a plurality of tuner groups based on rules that define what tuners are allowed in each of the tuner groups, each of the tuner groups has a first list of zero or more exclusive tuners and a second list of zero or more permitted tuners, the first list contains names for tuner objects that are to be placed only in that tuner group, the second list contains names for tuner objects that mac be placed into that tuner group and another tuner group, at least one of the tuner groups has at least one exclusive tuner and no permitted tuners, at least one of the tuner groups has at least one permitted tuner and no exclusive tuners; and creating an EPG for a first of the tuner groups, including:

i) creating at least one lineup object for each of a plurality of tuners in the first tuner that receive program content, each lineup object contains electronic program guide (EPG) data for a particular source of the plurality of sources of the program content;

ii) merging the lineup objects to create a hierarchical tree of lineup objects until a root lineup object is created, the merging includes merging at least two child lineup objects to form a parent lineup object, the merging child lineup objects includes merging EPG data in the child lineup objects; and iii) displaying an EPG interface based on the EPG data in the root lineup object.

11. A computer storage device as recited in claim 10, wherein the merging the lineup objects includes: selecting rules from a plurality of rule sets, the selected rules define how entries in the EPG data are to be merged, the selecting is based on whether the EPG data contained in the child lineup objects was collected in-band or out-of-band.

12. A computer storage device as recited in claim 11, wherein the instructions further cause the processor to perform: accessing new rules from an updated version of the plurality of rule sets; re-merging the lineup objects in the hierarchical tree or lineup objects derived from the lineup objects in the hierarchical tree to create a new hierarchical tree of lineup objects until a new root lineup object is created; and displaying a new EPG interface based on the EPG data in the new root lineup object.

13. A computer storage device as recited in claim 10, wherein the instructions further cause the processor to perform: determining that a change has occurred to the EPG data contained in at least one of the lineup objects that were created for each of the plurality of tuners; propagating the change up the hierarchical tree of lineup objects to the root lineup object to generate a new version of the root lineup object; and displaying a new EPG interface based on the EPG data in the new version of the root lineup object.

14. A computer storage device as recited in claim 10, wherein the instructions that cause the processor to perform merging the lineup objects cause the processor to perform: identifying a first of the child lineup objects as a primary and a second of the child lineup objects as a secondary; and merging the primary and the secondary into a parent lineup object, the merging is performed based on a set of rules in a merge lineup rule object.

15. A computer storage device as recited in claim 14, wherein the merge lineup rule object is selected based on whether the source of EPG data for the first lineup object and the second lineup object are in-band or out-of-band.

16. A computer storage device as recited in claim 14, further comprising: merging a first channel in the primary with a second channel in the secondary based on one or more channel merge rule objects that define rules for merging channels.

17. A computer storage device as recited in claim 16, further comprising: merging a first program in the primary with a second program in the secondary based on one or more program merge rule objects that define rules for merging programs.

18. A system including:
a processor; and
a computer storage device coupled to the processor and having stored thereon a set of instructions which, when executed on the processor, cause the processor to perform:
accessing EPG data for a plurality of program sources, the EPG data includes a first schedule associated with a first channel and a second schedule associated with the first channel, the first schedule is accessed in-band, the second schedule is accessed out-of-band, the first schedule includes information for programs for the first channel, the second schedule includes information for programs for the first channel;
merging the first schedule and the second schedule to form a merged schedule, the merging includes:
accessing a parameter for determining which programs from the first schedule and which programs from the second schedule should be used to form the merged schedule;
determining a point in the future based on the parameter;
adding programs from the first schedule that are prior to the point in the future to the merged schedule;
adding programs from the second schedule that are after the point in the future to the merged schedule;
receiving an update to the in-band accessed first schedule, the update includes a change to a first of the programs in the first schedule; and
updating the merged schedule to reflect the change in the first program.

19. A system as recited in claim 18, wherein the instructions which, when executed on the processor, cause the processor to perform:
displaying a user interface that indicates that the merged schedule contains a channel that has been merged, the channel is available from at least two different sources of the plurality of sources; and
allowing the user to select which of the at least two different sources will be used in future merges of the channel.

20. A system as recited in claim 18, wherein the instructions which, when executed on the processor, cause the processor to perform:
displaying a user interface that indicates that the merged schedule contains a channel that has been merged, the channel is available from at least two different sources of the plurality of sources; and
allowing the user to select which of the at least two different sources the user prefers to tune to for the channel.

* * * * *